Dec. 29, 1970
D. R. RORER
3,550,348
AUTOMATIC PACKAGE HANDLING APPARATUS
FOR A SKIN-PACKAGING MACHINE
Filed May 28, 1968
2 Sheets-Sheet 1
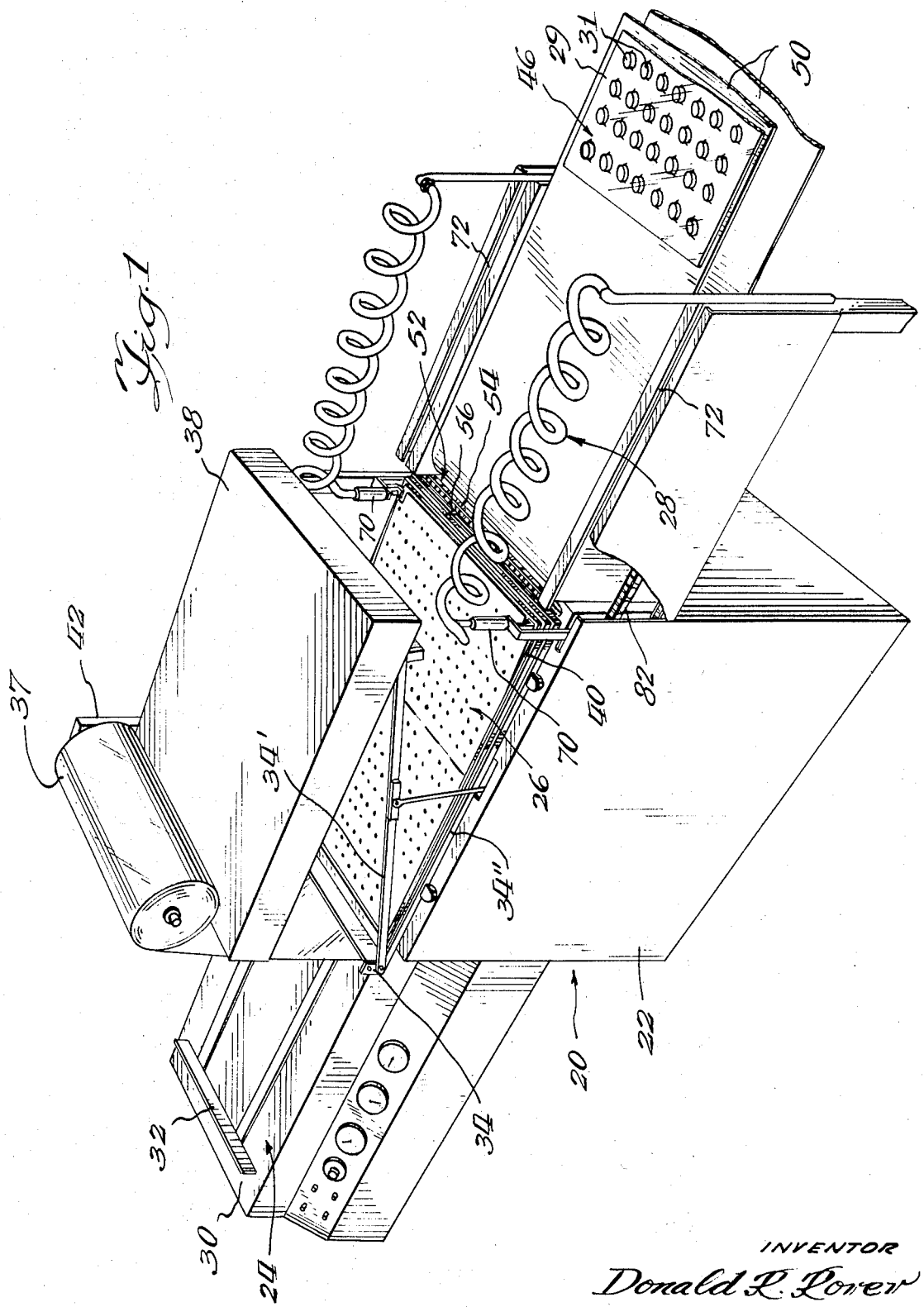
INVENTOR
Donald R. Rorer
BY Silverman & Cass
ATTORNEYS

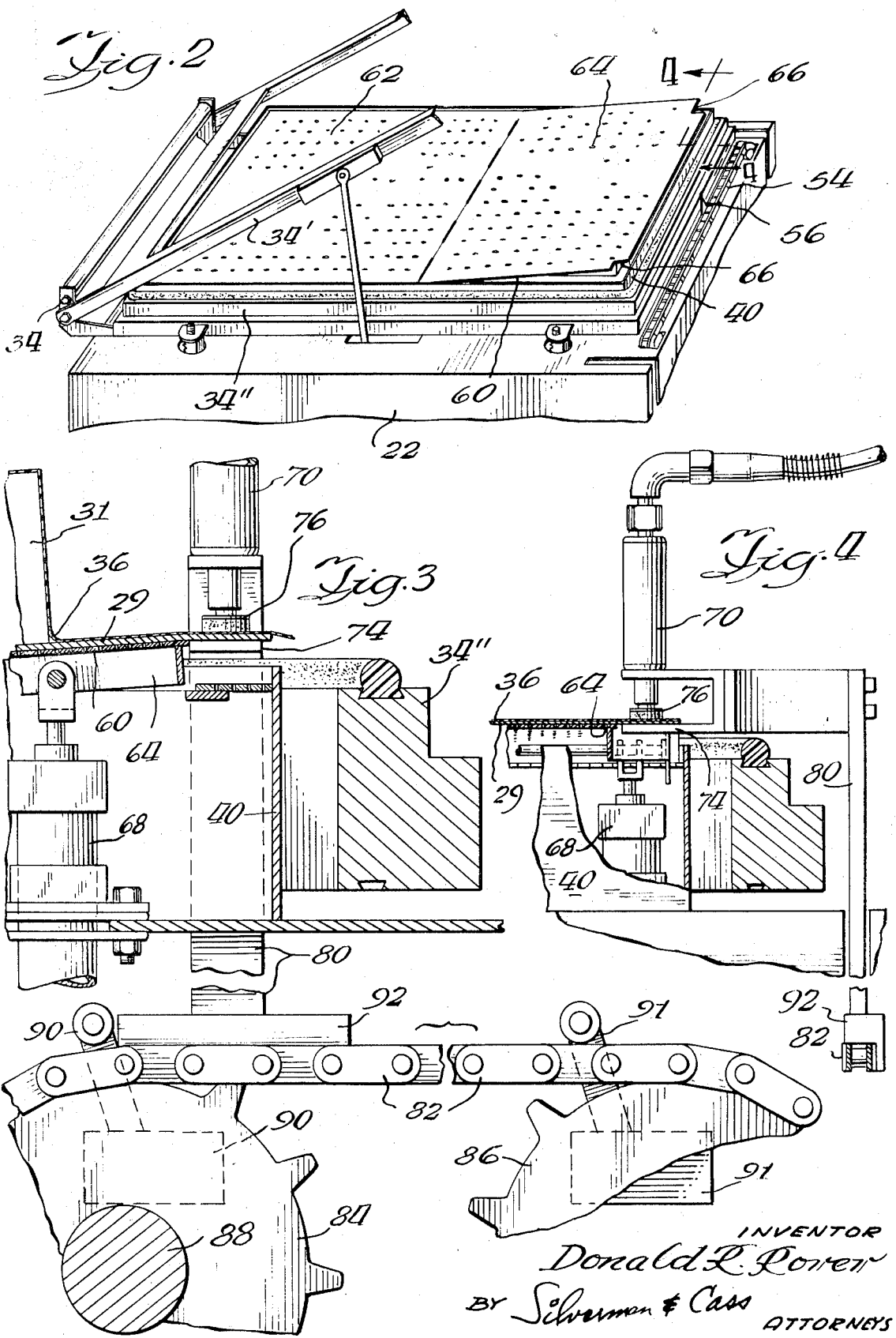

United States Patent Office 3,550,348
Patented Dec. 29, 1970

3,550,348
AUTOMATIC PACKAGE HANDLING APPARATUS FOR A SKIN-PACKAGING MACHINE
Donald R. Rorer, Lake Bluff, Ill., assignor to Stone Container Corporation, Chicago, Ill., a corporation of Illinois
Filed May 28, 1968, Ser. No. 732,768
Int. Cl. B65b 61/28
U.S. Cl. 53—112                                      4 Claims

ABSTRACT OF THE DISCLOSURE

A packaging machine for encasing an article on a base pad or substrate in a thin film of thermoplastic material in which the machine is provided with novel automatic package handling apparatus for removing the skin-package from the work area of the machine immediately after vacuum forming thereof so that a rapid and continuous sequence of operation may be obtained. The apparatus includes means for partially elevating the completed package and means thereafter for engaging and removing the elevated package from the said work area.

CROSS REFERENCE TO RELATED APPLICATIONS

A skin-packaging machine of the general type with which this invention is concerned is disclosed in my United States Pat. No. 3,377,770, filed Jan. 17, 1967 and entitled "Skin-Packaging Apparatus." The present invention is adapted for use with machines of the type described and claimed in said patent, as well as other types of skin-packaging machines.

BACKGROUND OF INVENTION

This invention relates generally to packaging machines for encasing an article or articles mounted on a base pad or substrate in a thin, protective film of thermoplastic material which is vacuum formed over the article or articles. Such machines are referred to in the trade, and hereinafter, as "skin-packaging machines," while the resulting product is termed, a "skin-package."

Skin-packaging has experienced a phenomenal growth in the area of relatively small consumer items for self-service merchandising, as well as in the area of rather large industrial articles. With regard to consumer items, this type of package is desirable in that the transparent plastic film allows the buyer to view the article being purchased. In addition, the substrate serves a dual function in that it provides a base for the article, and secondly, since it can be viewed through the transparent plastic film, it often carries advertising and other informative matter. In the area of industrial items, especially those which must be protected from dust, dirt, moisture, etc., during shipping, skin-packaging provides an effective, economical method of packaging wherein the film adheres to the base pad and prevents the ingress of foreign matter.

The basic steps involved in most skin-packaging processes are substantially the same. First, the article or articles to be packaged are placed on the base pad or substrate. The base pad normally is coated with an adhesive or is otherwise chemically conditioned to assure adhesion of the plastic film thereto. Further, the base pad must be highly porous to allow for withdrawal of the air so that the plastic film can be drawn into surrounding engagement with the article and into laminar contact with the upper surface of the base pad. After the article or articles have been positioned on the base pad, the pad is placed on a supporting means, such as a platen, associated with a vacuum source. The plastic film, which is usually drawn off a roll of sheet material, is supported between two open frame members which retain a section of the film in a substantially smooth, taut condition. The section of plastic sheet material supported by the open frame members next is heated to render it pliable and easily deformable by the vacuum forming apparatus. The heated film then is placed or draped over the carded article and the vacuum apparatus is actuated to draw the film into laminar contact with the upper surface of the base pad and into surrounding engagement with the article.

The complete operating cycle of a machine is unduly lengthened where the skin-package assembly is removed manually from the vacuum bed or work area. While there were some prior attempts at devising automatic package handling apparatus to expedite this operation, these were ineffective and unreliable. For example, attempts have been made to remove the skin-package assembly from the work area by gripping of the plastic sheet. However, since this plastic film is extremely thin, on the order of 3 mils, there is a strong likelihood that the film will be ruptured before removal is completed.

SUMMARY OF INVENTION

The invention is characterized by the provision of automatic handling apparatus in combination with a skin-packaging machine which enables the skin-package assembly to be rapidly and effectively removed from the machine work area without tearing the film. The handling apparatus utilizes elevator means to raise an edge of the substrate above the level of the work area such that removal can be effective by a retractile gripping means which engages the substrate in a manner assuring complete removal of the skin-package assembly and dependable operation with a minimization of machine down time.

BRIEF DESCRIPTION OF THE DRAWINGS

FIG. 1 is a perspective view of a skin-packaging machine having the automatic package handling apparatus embodying the present invention. Also shown is a conveyor positioned to receive the skin-package from said handling apparatus.

FIG. 2 is a fragmentary perspective view of the vacuum bed of the machine illustrated in FIG. 1 with elevator means in a raised position.

FIG. 3 is a fragmentary sectional view taken through the vacuum bed of FIG. 2 showing the substrate engaged by gripper means; in addition, FIG. 3 illustrates the drive mechanism for said gripper means.

FIG. 4 is a fragmentary sectional view taken along the line 4—4 of FIG. 2 and in the direction indicated generally.

DESCRIPTION OF THE ILLUSTRATED EMBODIMENT

Referring now to the drawings, in FIG. 1 there is illustrated a skin-package machine designated generally by the reference character 20 and embodying the invention. The machine 20 has a cabinet or base 22 and is comprised of three separate sections or stations; the first being the infeed station 24; the second being the vacuum-forming or work area 26; and the third being the package removal station 28.

The base pad 29 and associated articles 31 initially are placed upon the upper surface 30 of infeed station 24 and the pusher 32 operated to advance the base pad toward the vacuum station 26. During the advancing stage, the drape frame 34, which has a portion of the plastic sheet material 36 clamped between the edges thereof, is in the raised or pre-heat position immediately below the heater assembly 38. Accordingly, the base pad 29 and associated articles 31 can be received in superposed position on the vacuum bed 40 in preparation for the vacuum forming operation.

The plastic sheet material 36 is stored on roll 37 which is carried by a supporting boom 42, and from there, is fed to the drape frame 34 where it is clamped between the upper and lower open frame sections 34' and 34", respectively.

The illustrated machine 20 utilizes a stationary heating oven or hood 38 which is positioned horizontally oriented above the vacuum bed 40. Accordingly, when the drape frame 34 is raised to its uppermost position the clamped section of plastic sheet material 36 is positioned immediately below oven 38. In this position, the plastic sheet material 36 can be heated to the proper temperature to soften and render it suitable for vacuum-forming. The construction of the stationary heating assembly 38 is similar to that disclosed in the aforementioned U.S. Pat. No. 3,377,770; however, this is merely by way of illustration in that the present invention may be utilized with skin-packaging machines of a type other than that illustrated.

Once the plastic sheet material 36 is heated to the proper temperature, this preferably being achieved automatically, the drape frame 34 is lowered into surrounding engagement with the vacuum bed 40 to drape the heated plastic material 36 over the base pad 29 and associated articles 31. Next the air evacuating system (not shown) of machine 20 is actuated to evacuate the volume of space under the heated plastic sheet material 36 so as to draw said material downwardly into surrounding engagement with the articles and into laminar contact with the upper surface of the base pad as disclosed in Pat. No. 3,377,770.

After vacuum forming, the drape frame 34 is opened, and the automatic handling apparatus of the present invention is activated, either automatically by the built-in control system or by the operator, to grasp and remove the skin-package assembly, which is designated generally 46, from the work area 26. In the illustrated embodiment, the skin-package assembly 46 is deposited on a conveyor 50, however, it is contemplated also that slitting apparatus (not shown) may be employed in place of the conveyor 50 so that the skin-package 46 may be sectioned into a plurality of individual packages immediately after the said removal operation.

It should be noted that since the plastic sheet material 36, which covers the carded article after vacuum forming, is still attached to the roll 37, the removal of the skin-package assembly 46 from the work area 26 indexes the next section of sheet material 36 into position for clamping between the open frame members 34' and 34". However, before the skin package can be completely removed, sheet material 36 must be severed adjacent the base pad. Accordingly, severing apparatus designated generally 52 in FIGS. 1 and 2 is provided. While various types of severing apparatus may be employed the illusrated apparatus is of the type disclosed in my copending application Ser. No. 654,827, entitled "Film Severing Apparatus for Skin Packaging Machine," now abandoned and is comprised of a driven sprocket chain 54 which carries a knife blade 56. Thus, upon removal of the skin package 46, the plastic sheet material 36 will overlie chain 54. With the sheet material 36 so positioned, the drive for chain 54 is activated either manually by the operator or automatically by the control system of the machine 20, to cause the knife blade 56 to engage and sever the plastic sheet material.

The automatic package handling apparatus of the invention is comprised of two parts, namely, the elevator means for raising an edge of the substrate 29 above the uppermost level of the adjacent edge of the vacuum bed 40 and the retractile gripper means for grasping the substrate 29 and removing same from the work area 26 of the machine.

As seen in FIGS. 2–4, the elevator means is incorporated into and constitutes a portion of the vacuum bed 40. Basically, vacuum bed 40 is of a rectangular, boxlike construction, having a perforated upper supporting surface 60 which is associated with a vacuum system (not shown) for withdrawing air from under the plastic sheet material 36 once said material is draped over the substrate 29 and associated article 31. While the vacuum bed or platen 40 is of similar construction to that shown in Pat. No. 3,377,770, certain improvements have been incorporated therein to provide for automatic package handling. Specifically, the upper supporting surface 60 of the vacuum bed 40 comprises a stationary portion 62 and a hingedly connected portion 64 which may be pivoted upwardly out of the plane of surface 60. Accordingly, as illustrated in FIG. 3, when it is desired to remove the skin-package assembly 46 from the work area 26, the hingedly connected portion 64 is pivoted upward to raise an edge of the skin-package assembly 46 above the uppermost extremity of the adjacent edge of the vacuum bed 40, thus positioning same for engagement and removal.

As seen in FIG. 2 in the illustrated embodiment, the corners of the rear edge of the hingedly connected portion 64 are notched at 66 to ensure and facilitate exposure of the corners of the substrate 29 for grasping by the retractile gripper means, the latter to be described hereinafter.

In FIG. 3, the previously mentioned elevating apparatus may be viewed as would be the situation upon grasping of the package 46. To effect elevation or pivoting of the hingedly connected portion 64 there is provided a piston arrangement 68 which may be of the solenoid or fluid operated type. Thus, when the piston 68 indexes vacuum bed portion 64 to the illustrated position, the edge of the substrate 29 overlying the notched portions 66 is raised sufficiently to permit engagement thereof by the rectractile gripper means.

The overall arrangement for the rectractile gripper assembly is best viewed in FIG. 1. Basically, this arrangement employs a pair of clamps or grasping members 70, which also may be solenoid or fluid operated and which are mounted for controlled movement along parallel tracks 72 between a forward limit point and a rearward point. The construction of the clamping members 70 is illustrated in FIGS. 3 and 4, each being comprised of a lower stationary jaw 74 and an upper, movable jaw 76. When the clamping members 70 are at their forward point of movement, they align with the notched portions 66 and receive the corners of the substrate 29 between the upper and lower jaw portions. Accordingly, the upper, movable jaw 76 of each clamp, which initially is in the open position, is actuated to clamp or grasp the corner of the substrate 29 in preparation for removal of the skin package 46 from the vacuum bed 40.

After the substrate 29 has been firmly grasped by the jaws of the respective clamps 70, the drive mechanism for the rectractile gripper arrangement is actuated to cause the respective clamping members 70 to transverse along tracks 72 to the rearward point of movement so that the skin-package assembly 46 will be removed from the work area 26. Immediately prior to reaching the rearward point of movement, the upper clamp jaws 76 are automatically opened by the overall control system for the machine to release the skin-package assembly 46 and deposit same on the conveyor 50.

A portion of the drive mechanism for the retractile clamping members 70 is illustrated in FIG. 3. Each clamping member 70 is carried by a bracket 80 which, in turn, is affixed to a sprocket chain 82. The respective sprocket chains 82 are each engaged over a pair of sprocket gears 84 and 86, the forwardmost sprocket gear 84 for each clamping member being mounted on a common drive shaft 88. The drive shaft 88 is coupled operatively to a reversible drive motor (not shown), such that the chain 82 and the associated clamping member 70 may be moved in either direction.

To control the movement of the clamping members 70 along their respective tracks 72, a plurality of limit switches are employed which constitute a part of the overall control system for the machine, these switches being designated 90 and 91, respectively. The limit switch 90 is coupled in circuit with the reversible drive motor (not shown) and the overall control system for the machine and appropriately positioned so as to be engaged or tripped by the lower portion 92 of one of the brackets 80. Directing attention to FIG. 3, as the clamping members 70 near their forwardmost point of travel, the limit switch 90 will be engaged which, in turn, disengages or deenergizes the drive motor to properly position the jaws 74 and 76 of the clamping members 70 with respect to the hingedly connected portion 64 of the vacuum bed. Next, after clamping is effected, the overall control system automatically actuates or engages the drive motor and traverses the chain 82 in the opposite direction causing the clamping members 70 to move rearwardly and remove the skin package 46 from the vacuum bed. As the clamping members 70 near their rearmost point of travel, they engage a second limit switch 91 which also is operable to disengage the drive motor. In addition, switch 91 may also be associated with the control means for clamping member 70 so that immediately prior to said disengagement of the drive motor the jaws of said clamping members 70 are automatically opened to release the skin-package assembly and deposit same on conveyor 50. It can be appreciated that the clamping members 70 are now in position for the next cycle of operation and as soon as the next skin-package assembly is completed and the elevator means actuated to raise said skin-package assembly, the control system will again actuate the motor to cause the clamping members 70 to move forward to engage and remove the subsequent package from the vacuum forming area 26.

In practice, the overall control system for the entire machine, would include various elements such as timers, relays, switches and other circuitry which would control and provide sequence of operation as described, and these elements of the control system may be adjusted to attain the desired timing and length of operating cycle.

What is claimed is:

1. In a machine for packaging an article between a porous substrate and a thin protective film of thermoplastic sheet material which is vacuum-formed thereover to provide a skin-package assembly, said machine including, a vacuum bed having an upper surface for supporting the substrate and associated article, means for clamping a section of thermoplastic sheet material in position overlying the vacuum bed, a heater assembly for rendering said thermoplastic material amenable to a vacuum forming operation, and a vacuum forming system for drawing the heated thermoplastic material about the article and into laminar contact with the substrate, the combination therewith of automatic package handling apparatus for removing the skin-package assembly from the vacuum bed after the vacuum forming operation, said apparatus including: elevator means for raising at least one edge of the substrate above the uppermost portion of an adjacent edge of the vacuum bed, said vacuum bed having at least a portion of its upper supporting surface hingedly connected with respect to the remainder of said bed, so that said hingedly connected portion may be pivoted selectively to raise an edge of the substrate to a desired level; and retractile gripper means for sequentially grasping the raised edge of the substrate and removing the skin-package assembly from said vacuum bed.

2. In a packaging machine for encasing an article mounted on a substrate in a thin protective film of plastic sheet material which is vacuum formed thereover to produce a skin-package assembly, the combination therewith of automatic package handling apparatus for removing the skin package assembly from a supporting surface of the work area of the machine where the vacuum forming step of the skin packaging operation is completed, said automatic handling apparatus comprising: elevator means in which said supporting surface has at least a portion thereof hingedly mounted and pivotal out of the normal plane of said surface, for raising at least one edge of the substrate above the uppermost portion of an adjacent edge of said work area; and retractile gripper means for sequentially grasping the raised edge of the substrate and removing the skin-package assembly from said work area.

3. In a machine for packaging an article between a porous substrate and a thin protective film of thermoplastic sheet material which is vacuum-formed thereover to provide a skin-package assembly, said machine including, a vacuum bed having an upper surface for supporting the substrate and associated article, means for clamping a section of thermoplastic sheet material in position overlying the vacuum bed, a heater assembly for rendering said thermoplastic material amenable to a vacuum forming operation, and a vacuum forming system for drawing the heated thermoplastic material about the article and into laminar contact with the substrate, the combination therewith of automatic package handling apparatus for removing the skin-package assembly from the vacuum bed after the vacuum forming operation, said apparatus including: elevator means for raising at least one edge of the substrate above the uppermost portion of an adjacent edge of the vacuum bed; and retractile gripper means which include at least a pair of clamps mounted for controlled movement along a defined track of predetermined length whereby said clamps will grasp the corners of the raised edge of the substrate, traverse along said track to remove the skin-package assembly from the vacuum bed, and upon complete removal, release said skin-package assembly.

4. In a packaging machine for encasing an article mounted on a substrate in a thin protective film of plastic sheet material which is vacuum formed thereover to produce a skin-package assembly, the combination therewith of automatic package handling apparatus for removing the skin package assembly from a supporting surface of the work area of the machine where the vacuum forming step of the skin packaging operation is completed, said automatic handling apparatus comprising elevator means for raising at least one edge of the substrate above the uppermost portion of an adjacent edge of said work area, and rectractite gripper means which include at least a pair of clamps, each mounted for controlled movement, along a defined track of predetermined length so that said clamps will grasp the corners of the raised edge of the substrate, traverse along said track to remove the skin-package assembly from the work area, and upon complete removal, release said skin-package assembly.

References Cited
UNITED STATES PATENTS 3,270,482 9/1966 Kraut _____ 53—30
3,301,737 1/1967 Schmidt _____ 156—580X THERON E. CONDON, Primary Examiner E. F. DESMOND, Assistant Examiner.

U.S. Cl. X.R.

53—141